March 10, 1970 C. M. CLARKE 3,500,211

PULSE RECEIVER WHOSE OUTPUT DOES NOT RESPOND TO SIGNAL DISTORTION EXISTING DURING SHORT, INTERMITTENT PERIODS

Filed March 29, 1966 2 Sheets-Sheet 1

INVENTOR
COLIN MICHAEL CLARKE
BY
[signature], ATTORNEYS

INVENTOR
COLIN MICHAEL CLARKE
BY
Fredrikson, Fredrikson & Ohlinger
ATTORNEYS

United States Patent Office 3,500,211

Patented Mar. 10, 1970

3,500,211

PULSE RECEIVER WHOSE OUTPUT DOES NOT RESPOND TO SIGNAL DISTORTION EXISTING DURING SHORT, INTERMITTENT PERIODS

Colin Michael Clarke, London, England, assignor to The General Electric Company Limited, London, England, a British company Filed Mar. 29, 1966, Ser. No. 538,382
Claims priority, application Great Britain, Mar. 30, 1965, 13,534/65
Int. Cl. H04b *1/10*
U.S. Cl. 325—323 5 Claims

ABSTRACT OF THE DISCLOSURE

An apparatus for correcting errors in an electric signal in which information is conveyed by the occurrence during successive periods of nominally equal duration of one or another of two or more discrete states of an electric variable comprising: a majority vote detector arrangement and a further circuit producing an output signal which follows the output of the majority vote detector but whose output signal is inhibited from changing with the output of the majority vote detector for a predetermined period after each change in the output signal of the further circuit except those changes which occur as the result of the ending of a period of inhibition.

This invention relates to electric signalling systems.

The invention relates particularly to electric signalling systems of the kind wherein there are transmitted electric signals in which information is conveyed by the occurrence during successive periods of nominally equal duration of one or another of a plurality of discrete states of an electric variable.

In such a system it frequently occurs that the transmitted signal is so distorted during transmission that the received signal has the incorrect one of its discrete states for short, intermittent periods.

It is an object of the present invention to provide an apparatus for use in an electric signalling system of the kind specified by means of which such errors in the received signal may be corrected to a large extent.

According to the present invention an apparatus for correcting errors in the received signal in an electric signalling system of the kind specified comprises means for developing a signal having one or another of a said plurality of discrete states, the state of said developed signal at any instant being dependent on which one of its plurailty of states the received signal was in longest during a period of at least approximately said duration immediately preceding that instant, and means for producing in response to said developed signal a further signal having one or another of a said plurality of discrete states, the state of said further signal being dependent on the state of said developed signal, but the further signal being inhibited from changing its state for a period of at least approximately said duration after every change in its state except those changes in its state which occur at the ends of periods of inhibition.

One arrangement in accordance with the invention will now be described, by way of example, with reference to the accompanying drawings in which.

Figure 1:
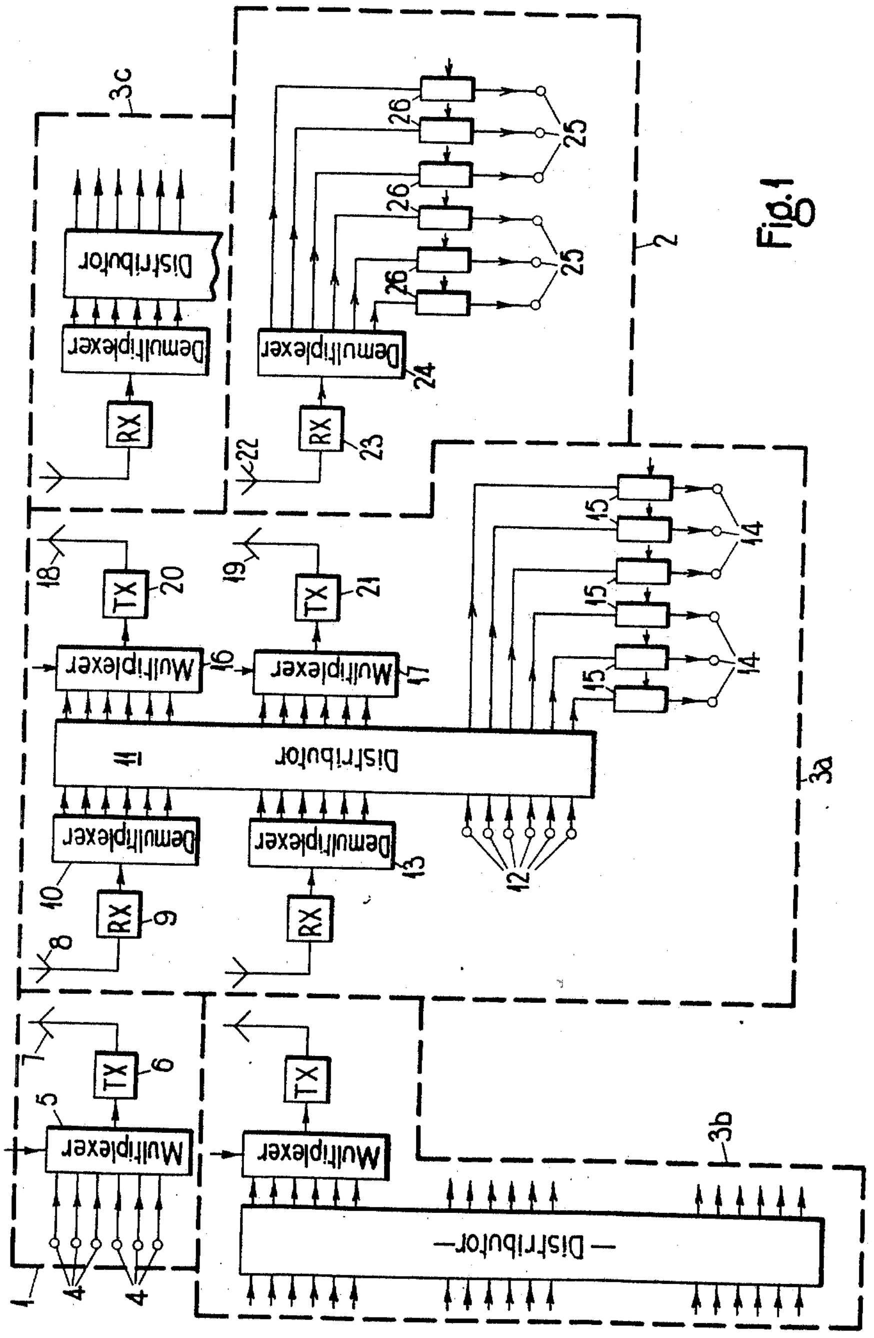
FIGURE 1 is a block schematic diagram of part of a multiplex data transmission system.

Referring to FIGURE 1, the system includes a large number of transmitting terminals 1 and receiving terminals 2 which are interconnected via switching centres 3. In the part of the system shown in FIGURE 1, only three switching centres **3*a*, 3*b* and 3*c* are present and only one transmitting terminal 1 and one receiving terminal 2**.

At each transmitting terminal 1 binary coded signals from six signal sources 4, which may, for example, be teleprinters, are successively sampled in a multiplexer 5 under the control of locally generated clock pulses having a repetition rate eight times that of the nominal digit rate in the output signals of the sources 4. The time division multiplexed signal so produced is fed to a transmitter 6 where it is utilised to modulate a radio frequency carrier wave in conventional manner, the resulting signal being fed to an aerial 7.

The transmitted signal is received by an aerial 8 at a switching centre **3*a* and is fed to a receiver 9 where it is demodulated. The demodulated signal is then demultiplexed in a demultiplexer 10 under the control of locally generated clock pulses whose repetition rate is locked to the mean digit repetition rate in the demodulated signal by means of an automatic frequency control circuit (not shown). The six demultiplexed signals are fed to a distributor 11** whose purpose is explained below.

A second group of six binary coded signals are applied to the distributor 11 from six local signal sources 12, and a third group of six binary coded signals are applied to the distributor 11 from a demultiplexer 13 which receives a six-channel multiplexed signal via a radio link from another switching centre **3*b*, similar to the switching centre 3*a***.

The distributor 11 serves to re-assemble the three groups of six binary coded signals applied to it into three different groups of six signals each. The signals comprising one of the new groups are fed to six local receiving instruments 14, for example teleprinters, via separate error correction circuits 15 which are described in detail below. The other two new groups of signals are respectively fed to two multiplexers 16 and 17 wherein they are time division multiplexed under the control of locally generated clock pulses having a repetition rate nominally the same as the clock pulse rate in the other multiplexers in the system. Each of the multiplexed signals is then fed to an aerial 18 or 19 via a transmitter 20 or 21 for transmission via a radio link to a further part of the system, one group being transmitted to a further switching centre **3*c* and the other group to a receiving terminal 2**.

At the receiving terminal 2, the received signal is fed from an aerial 22 via a receiver 23 to a demultiplexer 24, and the demultiplexed signals are fed respectively to local receiving instruments 25 via separate error correction circuit 26.

At the switching centre **3*c* the received signals are regrouped for transmission to further parts of the system or for application to local receiving instruments, as at the switching centre 3*b***.

During the passage of any particular binary coded signal through the system errors are liable to occur as a result of which the signal may, for short intermittent periods, have the wrong one of itst wo possible values. Such errors are liable to occur at random during transmission via the various radio links involved. In addition, further errors are liable to occur owing to the clock pulse rates at the various multiplexers in the systems not being synchronous. As a result of this, some digits in a particular signal may be sampled nine or seven times during multiplexing, instead of the correct eight times, according to whether the clock pulse generator controlling that multiplexer is running faster or slower than the clock pulse generator in the previous multiplexer through which that particular signal passed. This gives rise to the digits in a signal applied to a receiving instrument being of different lengths.

Figure 2:
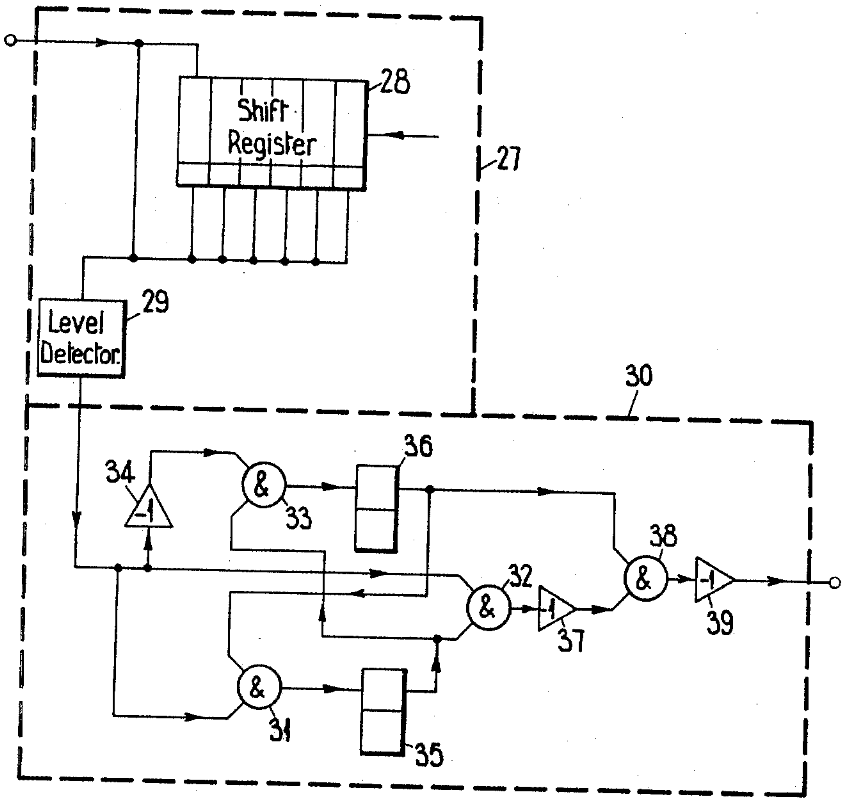
FIGURE 2 is a schematic circuit diagram of a part of the system shown in FIGURE 1.

To reduce the effect of the above-mentioned errors, each receiving instrument 14 or 25 is associated with an error correction circuit 15 or 26. Referring now to FIGURE 2, each error correction circuit 15 or 26 includes a running majority vote detector 27. The detector 27 includes a 6-stage shift register 28 to the input of which a received demultiplexed binary signal is applied, the shift register operating under the control of clock pulses having a repetition rate equal to eight times the nominal digit rate in the received signal. The output of each stage of the shift register 28 and the received signal are added together and applied to a level detecting circuit 29 which produces an output of greater or lesser magnitude in dependence on whether the magnitude of its input is greater or less than half the magnitude of its input when the received signal and the output signal of each stage of the shift register all have the larger of their two possible values. The signal at the output of the detector 27 thus has, at any instant, one or other of two discrete values in dependence on whether the received signal had its larger or smaller value for the majority of a period having a duration equal to ⅞ the nominal period occupied by a digit in the received signal.

Figure 3:
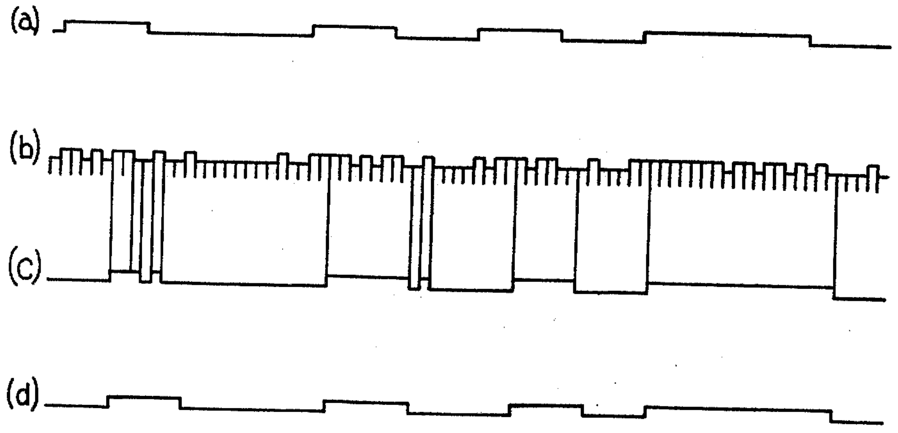
FIGURE 3 is a diagram illustrating the waveforms appearing at various parts of the circuit shown in FIGURE 2.

The operation of the detector 27 is illustrated in FIGURE 3. In FIGURE 3(*a*) there is shown the waveform of a signal generated by a signal source in the system. Due to the soccurence of errors, as explained above, on reaching the error correction circuit associated with the receiving instrument to which this signal is routed via the system, the signal may have the form indicated by the heavier line in FIGURE 3(*b*), the lighter vertical lines representing the clock pulses in the last demultiplexer through which the signal passed. It will be appreciated that owing to the manner in which the signals are reconstituted in the demultiplexers in the system, errors can occur in a signal only for periods having a duration equal to the interval between clock pulses in the last demultiplexer through which that signal passed, or to a multiple of that interval. The resulting signal appearing at the output of the running majority vote detector 27 is shown in FIGURE 3(*c*). It will be seen that at all times the signal shown in FIGURE 3(*c*) has its smaller or larger value according to whether the signal shown in FIGURE 3(*b*) had its smaller or larger value for the majority of an immediately preceding period having a duration equal to seven-eighths of the nominal period occupied by a digit in the received signal, that is during the majority of the immediately preceding seven clock pulse periods. It will be noted that the form of the signal in FIGURE 3(*c*) is quite similar to that of the original transmitted signal shown in FIGURE 3(*a*).

Reverting now to FIGURE 2, in order to further improve the form of the received signal the signal at the output of the detector 27 is fed to a circuit 30 arranged to extend the width of the pulses in the signal.

The circuit 30 comprises two "AND" gates 31 and 32 to one input of each of which the output of the detector 27 is applied, and a further "AND" gate 33 to one input of which the output of the detector 27 is applied via an inverter 34. The outputs of the gates 31 and 33 are respectively applied to two monostable trigger circuits 35 and 36 each of which, when triggered into its unstable state, remains in that state before returning to its stable state for a period having a duration equal to seven-eighths of the nominal duration of a digit in a binary coded signal produced by a signal source of the system. An output from the monostable circuit 35 is applied to the other input of the gate 32 and the other input of the gate 33, and the output of the gate 32 is applied via an inverter circuit 37 to one input of a further "AND" gate 38. An output from the monostable circuit 36 is applied to the other input of the gate 31 and the other input of the gate 38, and the output of the circuit 30 is derived from the output of the gate 38 via an inverter circuit 39.

The operation of the circuit 30 will now be described. In the following description the greater and lesser values of the output of the detector 27 will be designated 1 and 0 respectively, and the corresponding outputs of the various elements in the circuit 30 will be similarly designated.

When the monostable circuits 35 and 36 are in their stables states, each has an output 1. Consequently, one of the inputs of each of the gates 32 and 38 is 1 and the output of the circuit 30 follows the output of the detector 27. Thus, if the output of the detector 27 is 1, the inputs to the gate 32 are both 1 so that the output of the gate 32 is 1. The inputs to the gate 38 are therefore 0 and 1 respectively so that the output of the gate 38 is 0 and the output of the circut 30 is 1. Similarly, when the output of the detector 27 is 0, the inputs to the gate 32 are 0 and 1 respectively so that the output of the gate 32 is 0. The inputs to the gate 38 are therefore both 1 so that the output of the gate 38 is 1 and the output of the circuit 30 is 0.

When a changeover from 0 to 1 or vice versa occurs in the output of the detector 27 while both the monostable circuits 35 and 36 are in their stable state, one or other of the two monostable circuits 35 and 36 is triggered into its unstable state, causing the circuit 30 to be inhibited from responding to further changes in the output of the detector 27 until the triggered monostable circuit 35 or 36 returns to its stable state. Thus, when the output of the detector 27 changes from 0 to 1 the monostable circuit 36 is triggered into its unstable state. The output of the monostable circuit 36 then changes to 0 causing the gates 31 and 38 to shut; changes in the output of the detector 27 are thus prevented from affecting the circuit 30 until the monostable circuit 36 reverts to its stable state. While the monostable circuit 36 is in its unstable state, one of the inputs to the gate 38 is 0 so that the output of the gate 38 is 0 and the output of the circuit 30 is 1. When the monostable circuit reverts to its stable state one of the inputs of each of the gates 32 and 38 is 1 so that the output of the circuit 30 takes up the same value as the output of the detector 27 at that time, retaining this value until the next changeover in the detector output occurs.

Similarly, when the output of the detector 27 changes from 1 to 0, the monostable circuit 35 is triggered into its unstable state; the output of the monostable circuit 35 consequently becomes 0 so that the gates 32 and 33 shut, and the circuit 30 is prevented from responding to changes in the output of the detector 27 until the monostable circuit 35 reverts to its stable state. While the monostable circuit 35 is in its unstable state one of the inputs of the gate 32 is 0 and the output of the gate 32 is 0. The inputs of the gate 38 are consequently both 1 so that the output of the circuit 30 is 0. When the monostable circuit 35 reverts to its stable state both the gates 32 and 38 again have 1 at one of their inputs so that the output of the circuit 30 takes up the same value as the output of the detector 27, retaining this value until the next changeover occurs.

It will thus be seen that the output of the circuit 30 changes its value with changes in the value of the output of the detector 27, but is inhibited from changing in value for a period equal to seven-eighths of the nominal duration of a digit in the received signal after each change except such changes as occur at the end of a period of inhibition. FIGURE 3(*d*) shows the output of the circuit 30 in response to a detector output as shown in FIGURE 3(*c*). It will be noted that the form of this output is closely similar to the original transmitted signal shown in FIGURE 3(*a*).

It will be appreciated that while in the arrangement described above, by way of example, the signals are binary coded signals having only two possible levels, in other arrangements in accordance with the invention there may be provided apparatus for correcting errors in signals having three or more different levels. It is further pointed out that while in the arrangement described above the different states which the signals may have are different levels, in other arrangements in accordance with the invention the different states may involve other parameters, for example frequency or phase.

I claim:

1. An apparatus for correcting errors in a received signal in an electric signalling system of the kind wherein there are transmitted electric signals in which information is conveyed by the occurrence during successive periods of nominally equal duration of one or another of a plurality of discrete states of an electric variable, said apparatus comprising:

(a) majority vote detector means for developing a signal having a value at any instant which is representative as to which of its possible states said received signal was in longest during an immediately preceding period of at least approximately said duration;

(b) inhibiting means for producing a further signal whose value tends to follow the value of said signal developed by said majority vote detector means, said inhibiting means including a plurality of circuit means each responsive to a respective one of the possible changes in said representative value, each said circuit means inhibiting changes in said further signal for a period of at least approximately said duration after a change in said representative value, said change being one that is associated with the particular said circuit means and does not follow a previous change in said representative value within a period of at least approximately said duration.

2. An apparatus according to claim 1, wherein the number of discrete states is two and there is a respective said circuit means for each of the two possible changes in said representative value.

3. An apparatus according to claim 2 wherein said discrete states are different levels and said majority vote detector means comprises means for producing a signal whose value is representative of the sum of the values of the received signal at a plurality of instants during an immediately preceding period of at least approximately said duration and means for producing a signal having one or the other of two discrete values according to whether said sum is greater or less than half the value of said sum when the received signal has its greater level at each of said plurality of instants.

4. An apparatus according to claim 2 wherein said discrete states are different levels and said majority vote detector means comprises: a multi-stage shift register; means for applying the received signal to the input of the shift register; means for applying to the shift register clock pulses having a repetition rate such that when said register is full, the signals stored in the stages of the register respectively represent the values of the received signal at instants during an immediately preceding period of at least approximately said duration; and a level detecting circuit responsive to the sum of the outputs of the stages of the shift register.

5. An apparatus for correcting errors in a received signal in an electric signalling system of the kind wherein there are transmitted electric signals in which information is conveyed by the occurrence during successive periods of nominally equal duration of one or the other of two levels of an electric variable said apparatus comprising:

(a) majority vote detector means for developing a signal having a value at any instant which is representative of that one of said two levels which existed longest during an immediately preceding period of at least approximately said duration;

(b) inhibiting means for producing a further signal whose value tends to follow the value of said signal developed by said majority vote detector means, said inhibiting means comprising (1) two circuit means each including a monostable trigger circuit and a gating circuit, the output of said gating circuit controlling said monostable trigger circuit and said gating circuit having two inputs to which are respectively applied said developed signal and an output from the monostable trigger circuit of the other one of said two circuit means, the two circuit means being responsive to opposite ones of the two senses of change in the value of said developed signal, one or the other monostable trigger circuit being triggered to its unstable state by a change in value of said developed signal when both of said monostable trigger circuits are in their stable states, said unstable state being at least approximately said duration; and (2) a further gating circuit whose output constitutes said further signal, said further gating circuit having three inputs to which are respectively applied said developed signal and outputs from said two monostable trigger circuits, these latter two signals constituting inhibiting inputs for the further gating circuit which produces an output signal having one of two levels in the presence of one of said inhibiting inputs and the other of the two levels in the pressence of the other of said inhibiting inputs and which follows said developed signal in the presence of neither inhibiting input.

References Cited

UNITED STATES PATENTS 3,366,930 1/1968 Bennett et al. ---------- 325—42

ROBERT L. GRIFFIN, Primary Examiner

W. S. FROMMER, Assistant Examiner

U.S. Cl. X.R.

325—42; 328—162, 164